May 27, 1958 J. G. DRENNAN ET AL 2,835,963
APPARATUS FOR FEEDING, SORTING, AND APPLYING
RING FITMENTS TO CONTAINERS
Filed July 7, 1955 3 Sheets-Sheet 1

INVENTORS
JAMES G. DRENNAN
JOHN W. THOMSON Jr.
BY
ATTORNEYS

INVENTORS
JAMES G. DRENNAN
JOHN W. THOMSON Jr.
BY
ATTORNEYS

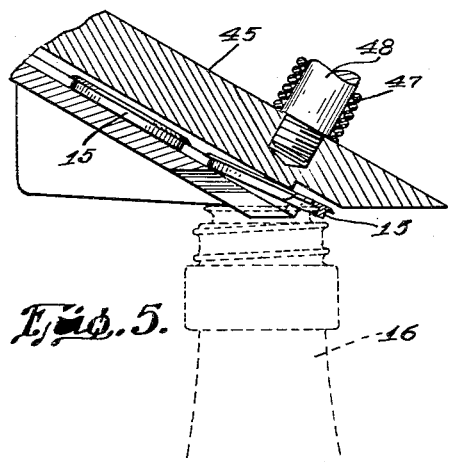
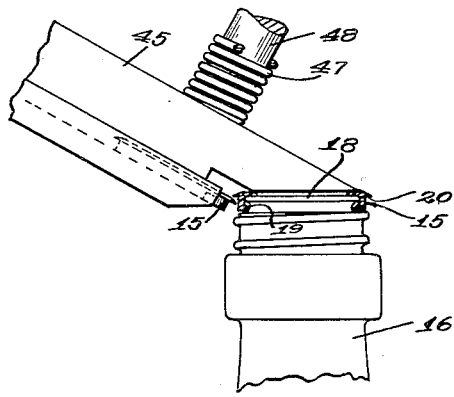
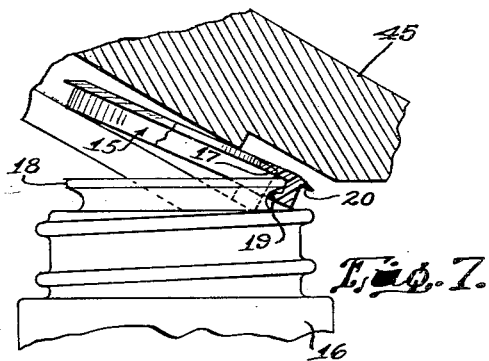
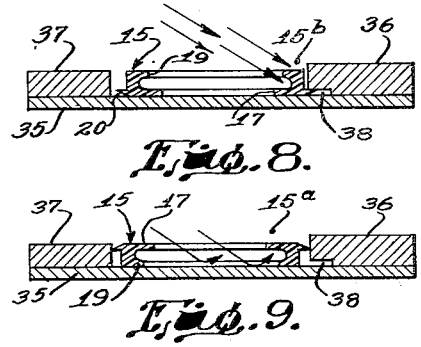
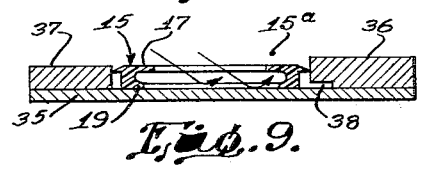
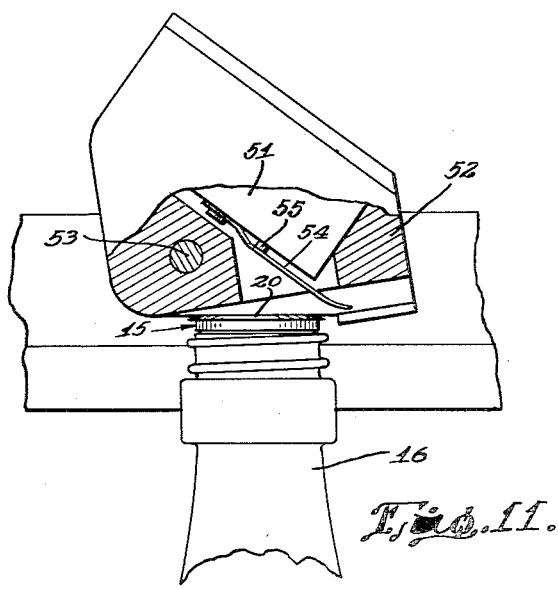
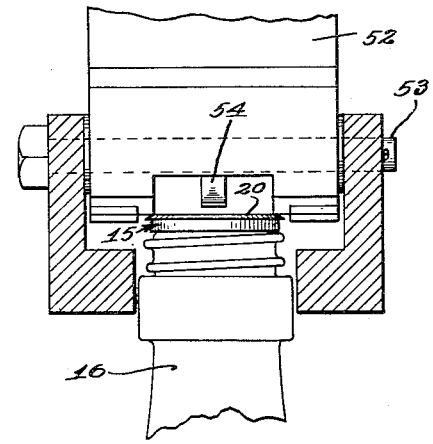

United States Patent Office 2,835,963
Patented May 27, 1958

2,835,963

APPARATUS FOR FEEDING, SORTING, AND APPLYING RING FITMENTS TO CONTAINERS

James G. Drennan, San Mateo, and John W. Thomson, Jr., Menlo Park, Calif., assignors to Owens-Illinois Glass Company, a corporation of Ohio Application July 7, 1955, Serial No. 520,449

14 Claims. (Cl. 29—211)

Our invention relates to apparatus for conveying fitments in the form of rings and applying them to the open ends of bottles or other containers. At the present day such fitments are in commercial use as attachments for bottles and serve to provide a pour-out lip which prevents dripping of the liquid contents on the outer surface of the container. Such fitments are in the form of rings shaped to fit over the bead or finish formed on the open upper end of the container, the rings being formed with a pour-out lip or flange extending throughout the circumference of the ring.

The present invention provides apparatus including a hopper to receive a supply of the fitments, an inclined chute down which the rings are fed on to a rotary disk and a second chute or guideway to which they are transmitted by the rotary disk. This second chute serves to convey the rings to the containers at an application station where the rings are attached to the containers. The rings normally are bottom side up on the rotary disk and until they enter the second chute and then are turned over to a normal right side up position during their transfer and application to the container. The invention provides means for automatically returning to the hopper the rings which are wrong side up on the transfer disk. The containers are brought seriatim to the ring receiving station by a continuously traveling belt conveyor. The invention provides automatic signaling means for indicating when a container passes without a ring fitment having been placed thereon.

Referring to the accompanying drawings which illustrate a preferred form of the invention:

Fig. 5 is a detailed sectional elevation showing the lower end section of the chute where the rings are transferred to the bottles;

Fig. 6 is a view of the parts shown in Fig. 5 but with the bottle in a more advanced position and with the ring fitment fully applied;

Fig. 7 is a fragmentary view similar to Fig. 5 but on a larger scale;

Fig. 8 is a cross section of the chute or guideway at the section line 8—8 on Fig. 3;

Fig. 9 is also a section at the line 8—8 on Fig. 3 but showing the ring fitment inverted with respect to the one shown in Fig. 8.

Fig. 10 is a section at the line 10—10 on Fig. 4 showing the signal operating means; and Fig. 11 is a part sectional elevation of the signal operating means viewed in a direction at right angles to that of Fig. 10.

Figures 1, 2:
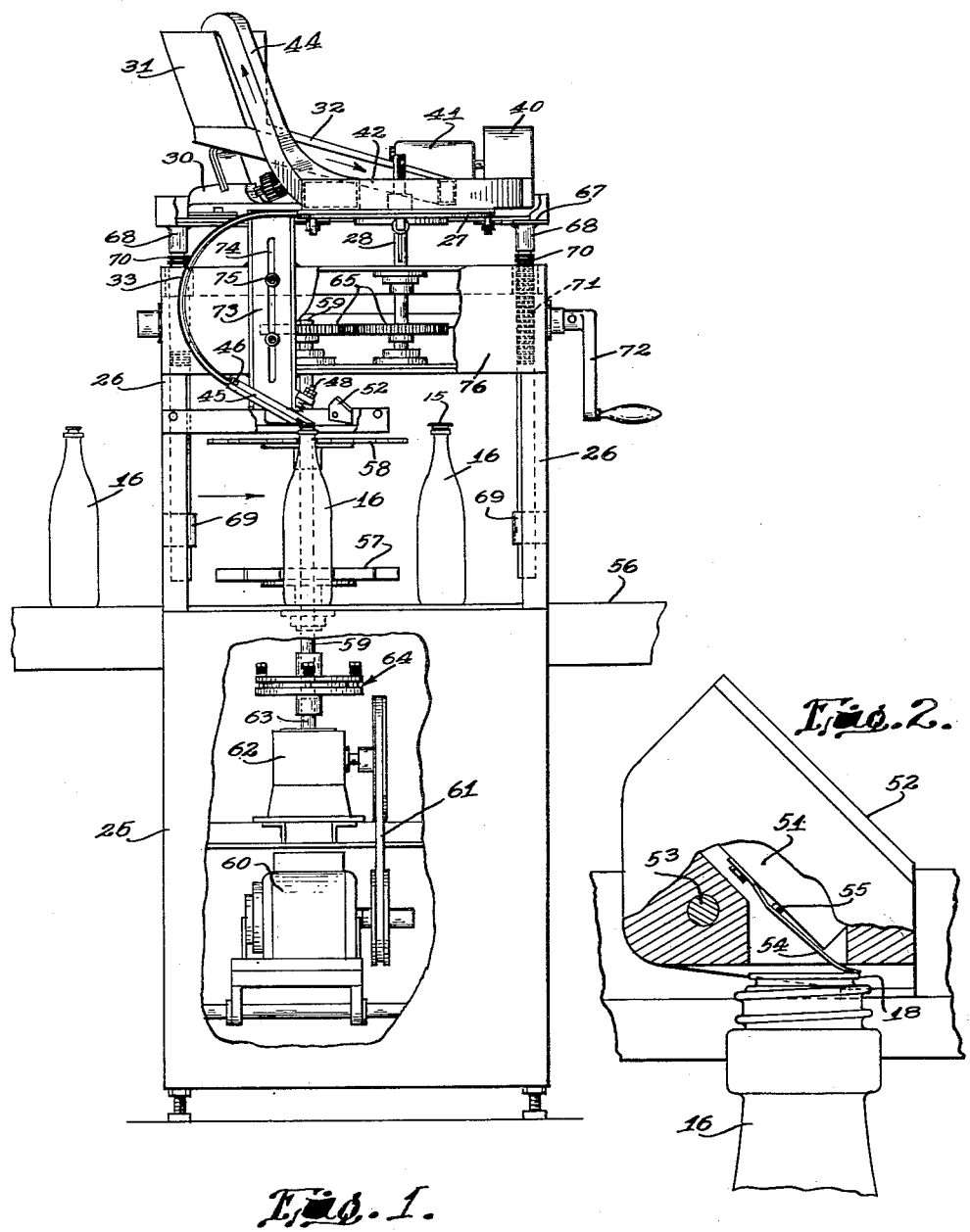
Fig. 1 is an elevational view of the apparatus, with parts broken away.
Fig. 2 is a fragmentary part sectional view of switch operating means comprised in the signaling device.

The fitments 15 are in the form of rings shaped to fit the upper ends of the containers 16, herein shown as bottles. The ring 15 is formed with an annular web portion 17 (Fig. 9) which, when applied to the bottle, extends inwardly over the upper surface of the bottle finish 18. The ring is also formed with a lower annular web 19 which fits beneath the bead or finish 18. The ring is thus formed with an annular recess along its inner surface to fit the bottle finish. The ring is preferably made of a resilient plastic such as polyethylene which permits the ring to be snapped into position on the bottle.

Referring to Fig. 1 the apparatus is mounted in a framework comprising the casing 25 and standards 26 rising therefrom. A horizontal disk 27 is splined on a vertical power driven shaft 28 by which the disk is continuously rotated. A vibrator 30 has attached thereto a hopper 31 in which a supply of the rings 15 are placed. The rings are fed down an inclined chute 32 onto the rotating disk 27. The normal position of the rings while on the disk is bottom side up as the rings are turned over during their travel from the disk to the receiving station. Some of the rings reach the disk 27 in the normal bottom side up position 15$^b$. Other rings 15$^a$ reach the disk in the reverse position. The rings are carried by the disk 27 to a guideway or channel 33 which is shaped to guide the rings in a substantially semicircular path to the application station at which they are applied and attached to the bottles 16.

The channel 33 as viewed in cross section (Figs. 8 and 9) comprises a bottom plate or floor 35 and guide rails 36 and 37, the inner edges of which form vertical side walls of the channel. The rail 36 is undercut to form a groove 38. When the ring 15 enters the channel 33 in its normal inverted position as shown in Fig. 8, the lip 20 enters the recess 38 which provides a guideway for said lip. If the ring enters the channel top side up as shown in Fig. 9, it is blown out of the channel and returned to the hopper.

Figure 3:
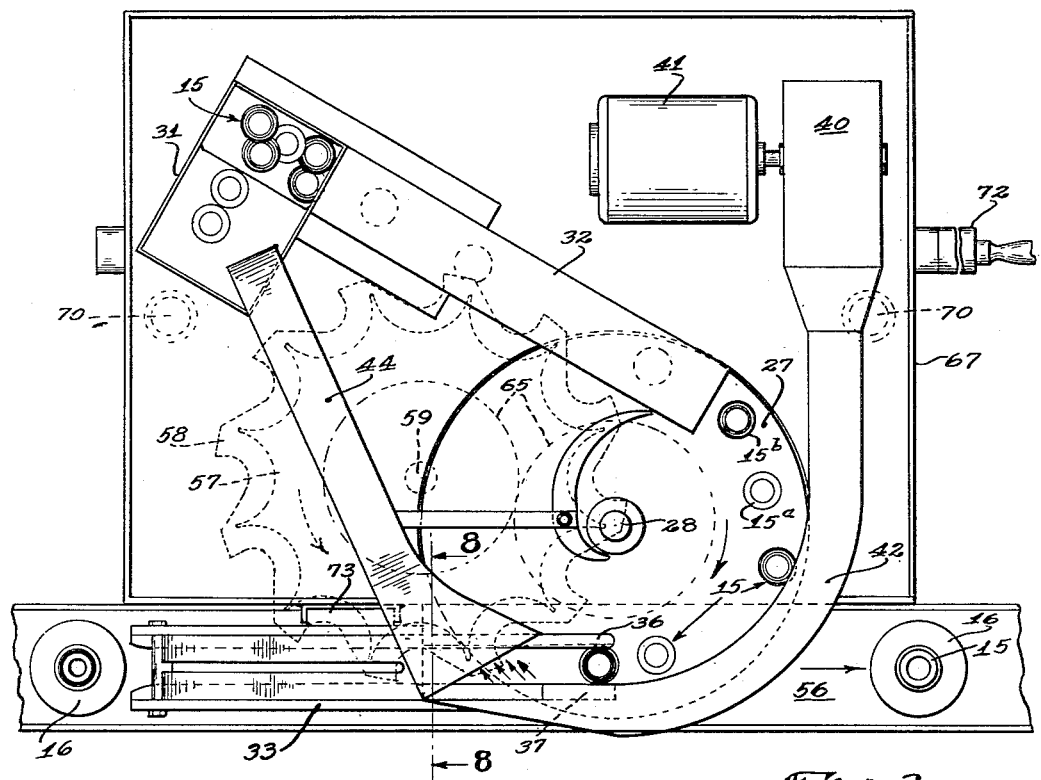
Fig. 3 is a plan view of the apparatus.

The blowing means for this purpose comprises a blower 40 (Fig. 3) driven by a motor 41. Air is thus blown through a conduit 42 which extends from the blower and has a discharge opening positioned over and adjacent to the receiving end of the channel 33. The air is blown in a downward and forward direction against the rings in the channel 33 as indicated by the arrows (Figs. 8 and 9). This air blast lifts the rings which are in the top side up position 15$^a$ and delivers them to an inclined chute or conduit 44 by which they are returned to the hopper 31.

Figure 4:
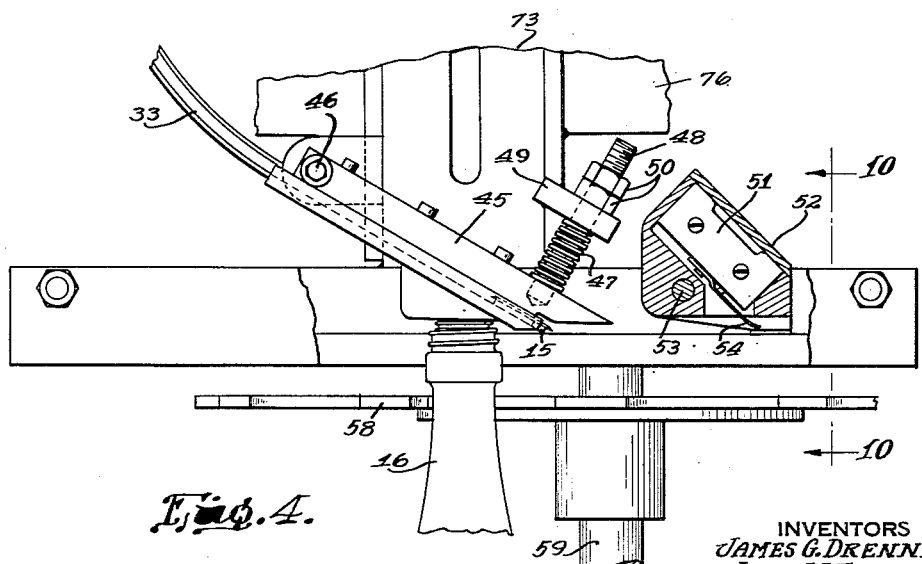
Fig. 4 is a part sectional elevation showing means for transferring the ring fitments from the chute on to the bottles or other containers and also showing the signal switch mechanism.

The rings entering the guideway 33 in the normal inverted position are carried by gravity downwardly through the guideway to a hinged section 45 which forms the lower end portion of the guideway. The section 45 is pivoted to swing about a horizontal pivot 46 and serves as a presser foot in applying the rings to the bottles. A coil spring 47 is mounted on a screw shaft 48 on the presser foot and held under compression between the presser foot 45 and a fixed stop 49. Nuts 50 adjustable on the screw shaft permit up-and-down adjustment of the section 45. Each ring 15 when it reaches the lower end of the section 45 is arrested as indicated in Fig. 4. The advancing bottle 16 as it reaches the position shown in Figs. 5 and 7 contacts the ring 15 and draws it forwardly while the spring 47 applies a downward pressure by which the ring is snapped into position on the bottle as shown in Fig. 6.

The signaling device for indicating when a bottle has passed through the station without a ring being applied thereto is as follows: Such device comprises a switch 51 carried in a holder 52 mounted to swing about a pivot 53. A leaf spring finger 54 attached to switch 51 extends over a switch operating contact button 55. When a bottle 16 with a ring 15 thereon passes beneath the holder 52 a shoe thereon is engaged by the ring 15, thereby swinging the holder 52 upwardly about its pivot 53, as shown in Fig. 11, so that the spring finger 54 is held out of contact with the ring 15 while the bottle passes beneath the holder 52. If the ring is missing from the bottle when the latter passes beneath the indicating device the finger 54 which projects downwardly into the path of the bottle is lifted thereby operating the switch contact device 55 and closing the switch. This establishes an electrical circuit for a lamp, bell or other signaling device, indicating to the operator that a bottle has passed without a ring fitment.

The bottles 16 are carried forward on an endless traveling belt conveyor 56. The bottles are guided through the ring receiving station by a pair of star wheels including a lower star wheel 57 and an upper star wheel 58 which engage the body and neck portions respectively of the bottles. The star wheels are mounted for continuous rotation on a shaft 59. The shaft 59 is driven by a motor 60 having driving connection therewith through a belt 61, gearing within a gear box 62, and a shaft 63. A friction clutch 64 provides a slip driving connection between the shafts 63 and 59. The transfer disk 27 is driven by the motor 60 operating through the shaft 59 and a train of gearing including intermeshing gears 65 connected respectively to the shafts 59 and 28.

The upper section of the machine is adjustable up and down for use with containers of different heights. The framework includes an upper adjustable member 67 with attached depending columns 68 which are guided in guideways 69 on the frame members 26. The columns 68 are provided with racks 70 driven by gears 71 operated by a hand crank 72. An upright frame member 73 secured and depending from the frame 67 has connection at its lower end for lifting and lowering the star wheel 58. The member 73 is formed with a slot 74 to receive clamping bolts 75 on a transverse casing 76 in which the gears 65 are housed. By loosening the clamping bolts 75 and operating the hand crank the star wheel 58 can be adjusted up and down.

Although the invention has been described as specifically adapted for applying ring fitments to bottle necks, it will be understood that the invention is not limited to this particular use but may be adapted for applying fitments to jars or other articles and such fitments may be of other types such as ring gaskets, disks, or other circular articles.

Modifications may be resorted to wthin the spirit and scope of our invention.

We claim:

1. Apparatus for applying circular articles to containers, comprising a holder for a supply of the articles, means for transferring the articles from the holder to an application station, the transfer means including a supporting surface on which the articles are supported at an intermediate position during the transfer to the application station, guiding means extending along said supporting surface for guiding the articles on said surface and forming with said surface a grooved guideway, and automatic means for segregating articles which are in an inverted position on said supporting surface from those in a normal position and directing those in normal position to the application station, said segregating means comprising a blower arranged to direct a blast of air against the articles moving along said guiding means, a chute through which the inverted articles are blown from said surface back to the holder while those in said normal position are retained on said surface by interengagement with the grooved guideway, and means at said station for applying the articles to the containers.

2. Apparatus for applying fitments to containers, said apparatus comprising a hopper to receive the fitments, means for bringing containers in succession to an application station spaced from the hopper, means for transferring the fitments from the hopper to said station, said transfer means including a supporting surface on which the fitments are received promiscuously, some in normal position and some inverted from said normal position, automatic means for separating the said inverted fitments from the others during said transfer, said separating means including means for directing a stream of air against the fitments on said surface and blowing the inverted fitments off said surface, means for preventing the fitments which are in normal position on being blown off said surface, and means at said application station to attach the fitments to the containers.

3. Apparatus for applying fitments to containers, said apparatus comprising a hopper to receive the fitments, means for transferring the fitments from the hopper to an application station, means for bringing the containers in succession to said station, said transfer means comprising a supporting surface on which the fitments are supported during a portion of their travel from the hopper to the application station, means forming a guideway along which the fitments which are in normal position on said surface are guided during their transfer from said surface to the application station, said guideway being formed to receive and to hold the articles which are in said normal position, means for directing a stream of air against the articles on said surface and blowing off said surface articles which are inverted from said normal position, and means at said application station for attaching the fitments to the container.

4. The apparatus defined in claim 3, said apparatus including a chute positioned to receive the articles which are blown off said surface and return them to the hopper.

5. The apparatus defined in claim 3, the transfer means including a horizontal disk mounted for rotation about its axis, the upper surface of the disk forming said supporting surface for the fitments.

6. The combination of a conveyor by which open-mouth containers are brought in succession to an application station, a receptacle to receive a supply of rings to be applied as fitments to said containers, said receptacle being positioned above the said station, means for transferring the rings from the receptacle to said station including a horizontal disk mounted for rotation about its axis, means for rotating the disk, said transferring means including a chute positioned to transfer the rings from the receptacle to said disk, with the rings positioned promiscuously, some in normal position on the disk and some inverted from said normal position, means providing a guideway extending from the disk to the application station, said guideway shaped and positioned to receive the rings which are in said normal position, means for supplying a stream of air directed against the rings on said disk and blowing said inverted rings away from the said guideway, and means at the application station for applying the rings to the container.

7. The apparatus defined in claim 6, said guideway including a holding surface by which the rings in normal position are prevented from being blown away from the guideway and a chute positioned to receive the said inverted rings and guide them back into the said receptacle, and means for directing said stream of air into said chute.

8. The apparatus defined in claim 7, the means for supplying the stream of air including a blower, a motor for operating the blower, and a conduit extending from the blower toward the said guideway, the discharge end of said conduit being positioned over the guideway and arranged to direct the stream of air in a downwardly inclined direction against the rings in the guideway.

9. The apparatus defined in claim 6, said guideway comprising a floor and side walls spaced apart to receive the rings therebetween, one of said side walls being undercut to provide a groove to receive and form a guideway for an annular lip formed on the ring.

10. The apparatus defined in claim 6, the guideway being curved downwardly from the said disk and terminating in a downwardly inclined section positioned over the path of the containers, and spring means cooperating with said section for transferring the rings to the containers at said application station.

11. The apparatus defined in claim 10, the said conveyor being extended beyond the application station for advancing the containers beyond said station, and signal means positioned in the path of the containers as the latter are advanced beyond the application station and operable automatically to give a signal when a container is carried beyond said station without a ring applied thereto.

12. Apparatus for applying ring fitments to containers, said apparatus including a horizontally traveling conveyor by which the containers are carried in succession to and beyond an application station, means at said station for applying a fitment to each container, and signal means for giving a signal when a container passes through said station without a fitment applied thereto, said signal means including a carrier movably mounted over the path of the containers, a switch and switch operating member carried by said movable carrier, said switch operating member being positioned to be engaged by the container and operate the switch when a fitment is missing from the container, said carrier extending into the path of the fitment on the container and operable thereby to move said carrier to inoperative position and prevent operation of the said switch operating device.

13. The combination of a horizontally traveling belt conveyor by which bottles or other containers placed in upright position on the conveyor are carried forwardly in succession in a horizontal path through an application station, guiding means for guiding ring fitments to the application station for application to the containers at said station, said guiding means comprising a downwardly and forwardly inclined guideway mounted over the said conveyor and extending substantially in the vertical plane of said conveyor, said guideway being positioned and arranged to guide the fitments downwardly and forwardly, holding means at the lower end of said guideway for holding each fitment in a position in which the forward portion of the fitment extends into the path of the upper ends of the containers permitting each fitment to be drawn by a container off the holding means and on to the container, spring means for pressing the fitment into position on the container, a vertical shaft, star wheels mounted on said shaft in position to engage respectively the body portion and the neck portion of each article during its transfer through said station, and means for rotating the said shaft.

14. The apparatus described in claim 13, the means for rotating said shaft comprising a motor and a friction clutch interposed between the motor and said shaft.

References Cited in the file of this patent

UNITED STATES PATENTS

| 948,688 | Kirkegaard | Feb. 8, 1910 |
| 1,379,118 | Marsa | May 24, 1921 |
| 2,596,408 | Johnson et al. | May 13, 1952 |
| 2,635,800 | Dickinson | Apr. 21, 1953 |
| 2,732,114 | Annen | Jan. 24, 1956 |